Patented Mar. 11, 1924.

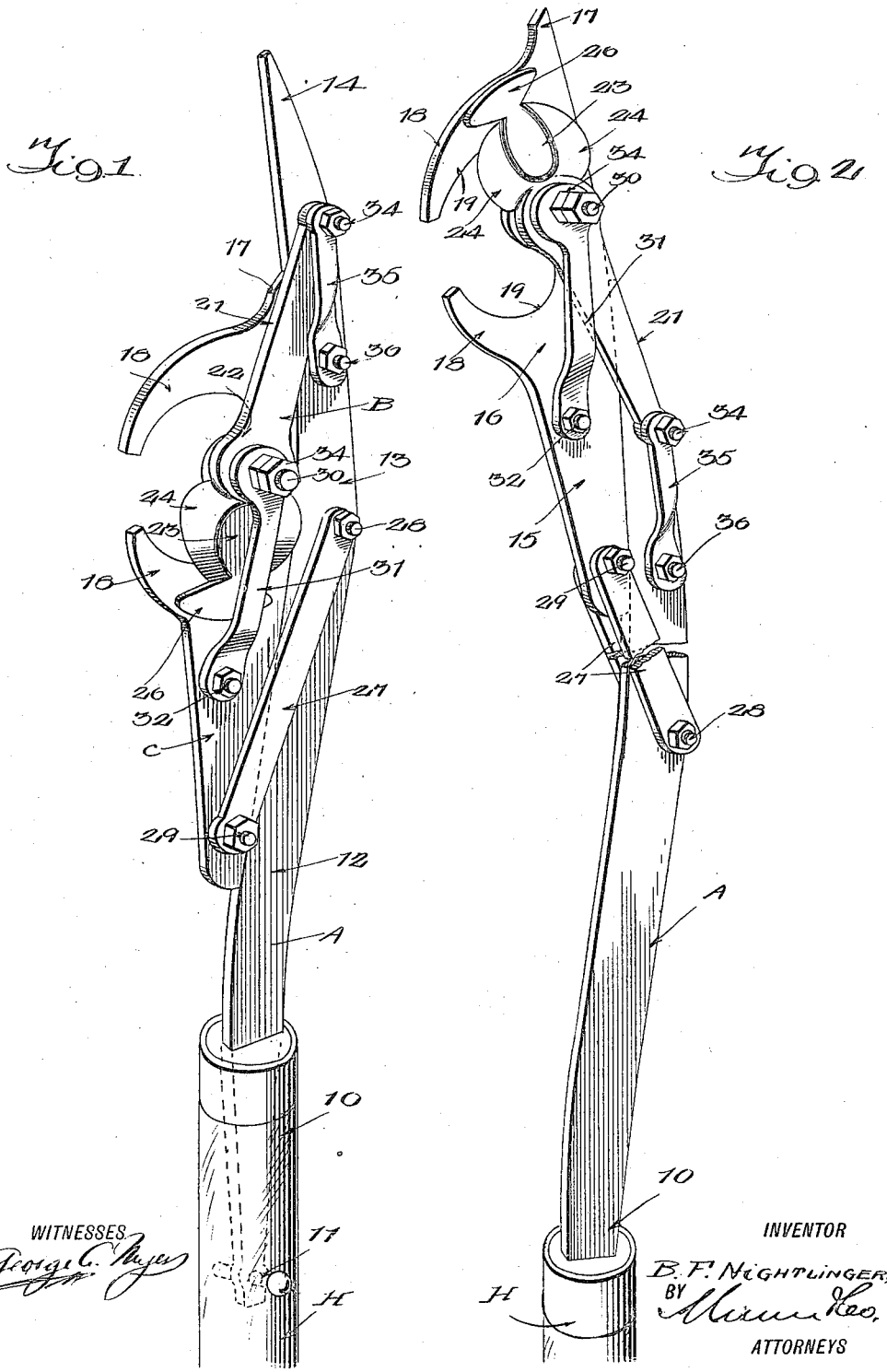

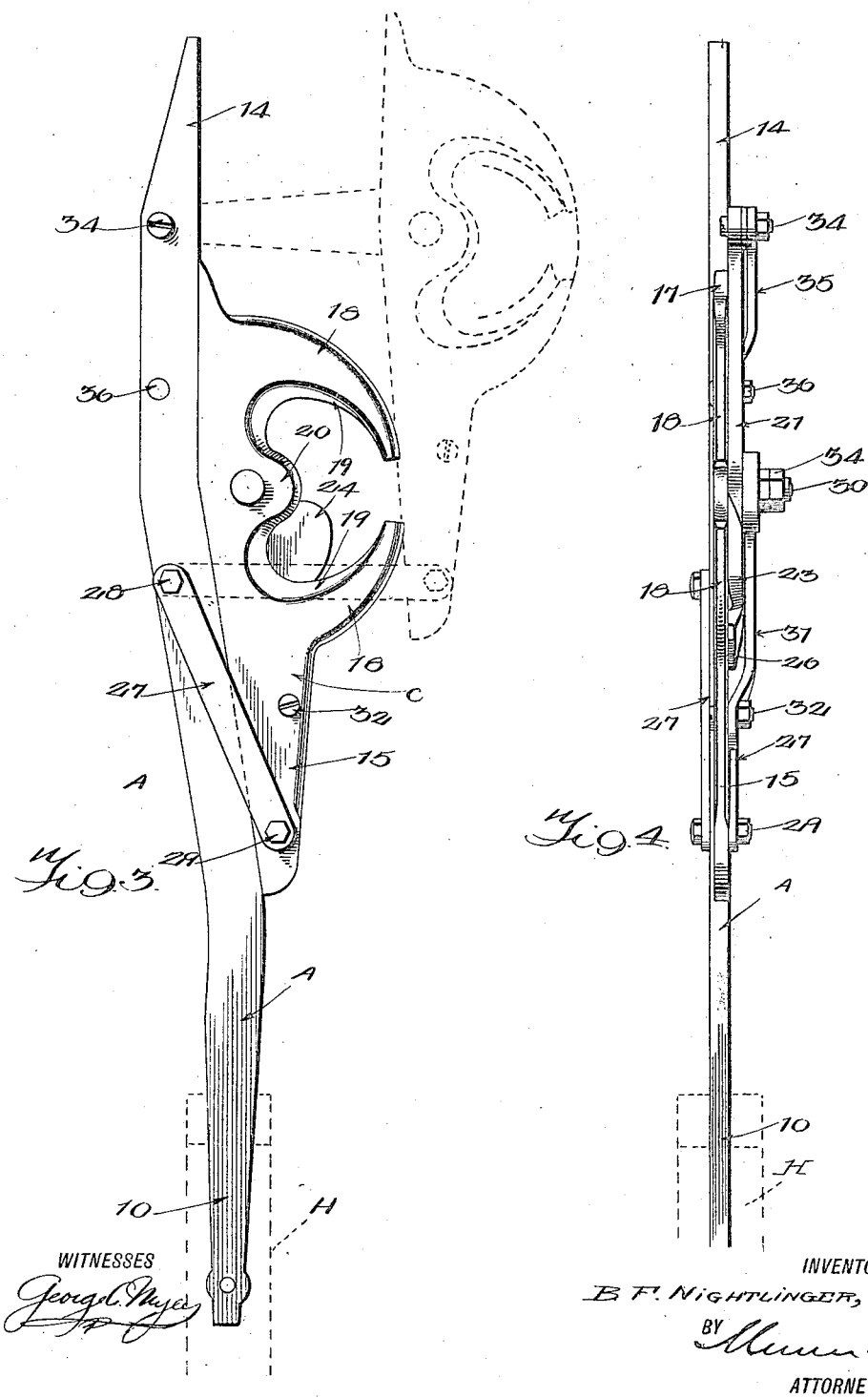

1,486,538

UNITED STATES PATENT OFFICE.

BENJAMIN F. NIGHTLINGER, OF WASHINGTON, DISTRICT OF COLUMBIA.

PRUNING IMPLEMENT.

Application filed March 2, 1922. Serial No. 540,593.

*To all whom it may concern:*

Be it known that I, BENJAMIN F. NIGHT-LINGER, a citizen of the United States, and a resident of Washington, District of Columbia, have invented certain new and useful Improvements in Pruning Implements, of which the following is a specification.

This invention relates to improvements in pruning implements.

The object of the invention is to provide a pruning implement having but one handle for operating the same and adapted to be positioned for severing a limb from a tree or the like, when pulling upon the handle or positioned for severing a limb when pushing upon the handle, and thus making it possible to operate the device for cutting the limbs from shrubery or trees in an easy and expeditious manner.

It is also among the objects of the invention that the device be exceedingly simple in construction and inexpensive to manufacture.

Other objects will hereinafter appear.

The invention is illustrated by way of example in the accompanying drawings, in which:—

Figures 1 and 2 are perspective views of the pruning device and showing the same when positioned for cutting a limb with the downward pull upon the handle and with pushing the handle upwardly, respectively.

Figure 3 is a view in side elevation of the pruning device illustrating two positions of the cutter elements in dotted lines and full lines, respectively.

Figure 4 is an edge view of the pruning device.

Referring to the drawings more particularly, A indicates generally what may be termed the actuating bar, C the cutter bar and B the blade. These three constitute the operating elements of the device.

The actuating bar A consists in an elongated member as shown, the lower end portion 10 of which is tapered so that the same may be fitted into the end of a handle H. Adjacent the lower end of the actuating bar there is provided an opening 11 through which a pin may be extended for positively securing the actuating bar A to the handle H. The actuating bar A at the point 12 is slightly curved rearwardly and at the point 13 is similarly curved forwardly. The outer end of the actuating bar is formed with a pointed portion 14.

The cutter bar C consists in an end shank portion 15 and the enlarged end 16 which terminates in a point 17 and which is formed with a recess corresponding substantially to the outline of a heart and providing the two jaws 10 which oppose each other and their free ends spaced. The opposing edges 19 of the jaws are curved as shown and each formed into a cutting edge as best illustrated in Figure 3. Between the cutting edges of the jaws 18 there occurs a protrusion 20 which may be blunt.

The blade B comprises the shank portion 21 which terminates at its one end in an enlargement 22, said enlargement continuing into a substantially heart shaped blade generally indicated by the reference numeral 23, said blade having each side formed with a cutting edge 24 and terminating in a portion 26 which is substantially triangular in shape. The blade 23 although corresponding in outline to the recess in the cutter bar C which forms the pair of cutter jaws 18 is less in dimensions than said recess as illustrated in the different figures of the drawings.

The lower end of the cutter bar C is connected to the actuating bar A by the pair of links 27, said links being pivotally connected to the actuating bar by a bolt 28 and likewise connected to the lower end of the cutter bar C by a bolt 29. Adjacent the protrusion 20 of the cutter bar there is provided a suitable opening through which the bolt 30 passes, said bolt also extending through the enlargement 22 of the blade B and through the one end of a brace member 31. The bolt 30 serves to pivotally connect the blade B and cutter bar C at the points specified. The purpose of the brace 31 is obvious, said brace having its other end pivotally secured to the cutter bar C by the bolt 32. The bolt 31 may carry the lock nuts 34 by which the same may be adjusted to permit free pivotal movement of the members which it connects. The other end of the blade B is pivotally connected to the actuating bar A by the bolt 34 and at a point adjacent the upper end of the actuating bar as illustrated in the different views of the drawings. A brace strip 35 is also provided for the inner end of the cutter blade B, said strip being pivoted by the bolt 34 at its one end and pivoted to the actuating bar A by a bolt 36 at its other end.

In the operation of the present device, the cutter bar C may be brought to engage the actuating bar A in two positions as illustrated in Figures 1 and 2 of the drawings. In Figure 1 the cutter bar is shown in its lowermost position and in Figure 2 in its uppermost position. These are the two extreme positions of the cutter bar C and in each instance the inner end of same will engage with the opposing edge of the actuating bar A.

The position of the cutter bar illustrated in Figure 1 brings the knife blade in its lowered position. After a limb is inserted between the cutter jaws 18 as illustrated in this Figure, then upon pulling downwardly upon the actuating bar A by means of the handle H, the cutter bar will swing upwardly and in doing so sever the branch disposed between its cutter bars. The severing of the branch is accomplished by the co-operation of the associated edges of the blade B and jaws 18 in an obvious manner. The blade extension 26 of the cutter blade serves to bridge the distance between the jaws 18 and increase the positive operation of the device and also serves to draw the limb which it is intended to sever in between the edges of the blade B and jaws. In other words, should the limb be in the position as illustrated in Figure 1 the same will be first engaged by the extension 26 and drawn upwardly and thus to insure that each operation will sever the branch or limb intended.

If it is intended to work quickly in pruning a tree, and a branch or twig has been severed with the upward movement of the cutter bar just described, then the jaws 18 may be brought to surround another limb with the blade B in the position it assumed when completing its last operation. Upon pushing upward upon the handle H and actuating bar A the blade B will swing downwardly and the blade extension 26 will draw the limb between the lowermost edges of the blade B and jaws 18.

In severing a large limb it is of course desirable that the upward stroke of the blade B and downward pull of the handle H be employed. In case that a large branch has been severed and it is desired to sever another large branch then the point 17 of the cutter blade may be employed for a purpose, that is, the same may be gouged into a limb of a tree and by light pressure with the handle H the cutter bar may be caused to assume its lowered position as shown in Figure 1 and then the device may be placed upon a limb for severing the same with the upward stroke or swinging movement of the blade B and cutter bar C.

While I have shown and described the preferred form of my invention, I wish it to be understood that I am aware of the fact that the construction, combination and arrangement of parts may be changed by those skilled in the art without departing from the spirit of the invention as indicated by the appended claims.

I claim:—

1. In a device of the character described, a cutter bar consisting in an elongated plate member formed with a pair of cutter jaws, each of which has a curved cutting edge and the free ends of said jaws being spaced from each other, a cutter blade pivoted to said plate and having a pair of cutting edges, one for each of the jaws, said cutter blade being adapted to be swung to move over said cutter jaws for severing objects disposed between either of the cutter jaws and associated edge upon the cutter blade, and an enlargement formed upon the free end of the blade adapted to bridge the gap between the free ends of said cutter jaws for the purpose described.

2. In a device of the character described, a cutter bar consisting in an elongated plate member formed with a pair of cutter jaws, each of which has a curved cutting edge and the free ends of said jaws being spaced from each other, a cutter blade pivoted to said plate and having a pair of cutting edges, one for each of the jaws, said cutter blade being adapted to be swung to move over said cutter jaws for severing objects disposed between either of the cutter jaws and its associated edge upon the cutter blade, and an enlargement formed upon the free end of said cutter blade, said enlargement having divergent inner edges and adapted to bridge the gap between the free ends of said cutter jaws for the purpose described.

3. In a device of the character described, a cutter bar consisting in an elongated plate member formed with a pair of cutter jaws, each of which has a curved cutting edge and the free ends of said jaws being spaced from each other, a cutter blade pivoted to said plate and having a pair of cutting edges, one for each of the jaws, said cutter blade being adapted to be swung to move over said cutter jaws for severing objects disposed between either of the cutter jaws and associated edge upon the cutter blade, and an enlargement formed upon the outer end of the cutter blade having inner divergent edges for the purpose described.

4. In a device of the character described, a cutter member having a flat side or face, a blade movable over and upon the flat side or face of the cutting member, said blade having a convex cutting edge, and an extension at the outer end of said blade having an edge adapted to be disposed at an acute angle with respect to the associated cutting edge of the blade.

5. In a device of the character described, a pair of opposing cutting jaws having a flat side or face, a blade adapted to move over and upon said jaws, said blade having a convex cutting edge for each of said jaws, and an extension formed at the outer end of said blade, said extension having edges adapted to form an acute angle with each cutting edge of the blade for the purpose described.

BENJAMIN F. NIGHTLINGER.